Feb. 23, 1932.  G. R. BROWN ET AL  1,846,946
PROPORTIONING VALVE
Filed May 30, 1930
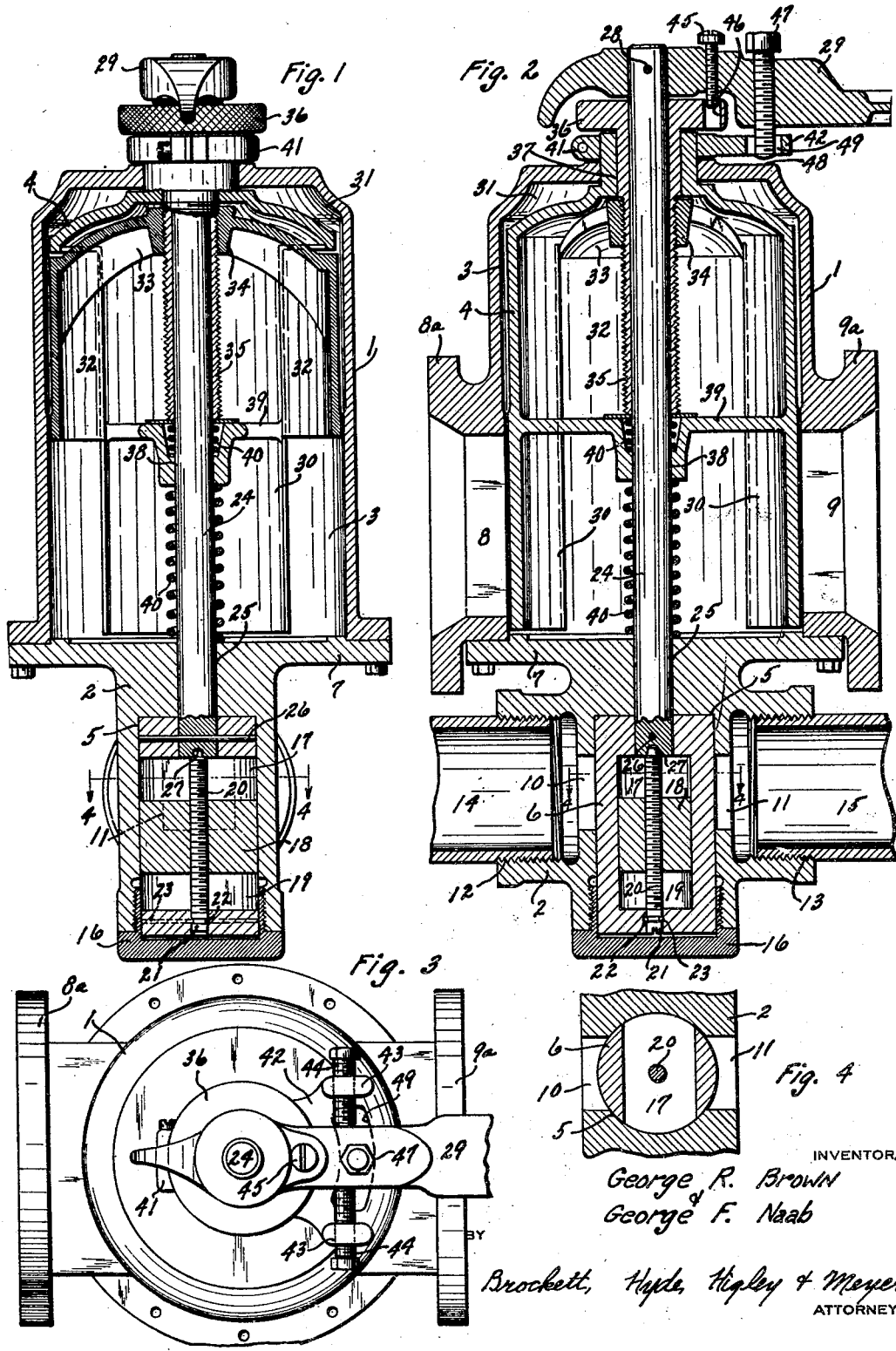
INVENTORS
George R. Brown
George F. Naab
BY Brockett, Hyde, Higley & Meyer
ATTORNEYS Patented Feb. 23, 1932

1,846,946

UNITED STATES PATENT OFFICE

GEORGE R. BROWN AND GEORGE F. NAAB, OF CLEVELAND, OHIO, ASSIGNORS TO THE NORTH AMERICAN MANUFACTURING COMPANY, OF CLEVELAND, OHIO, A CORPORATION OF OHIO

PROPORTIONING VALVE

Application filed May 30, 1930. Serial No. 457,631.

This invention relates to so-called proportioning valves such as are employed for proportioning and controlling combustible mixtures of gas and air.

Such a proportioning valve comprises in reality a pair of valve units, one for inclusion in a gas line, the other for inclusion in a corresponding air line, the two valves being co-related to open and close together. Conveniently a common valve body is provided for the two valves, which are cylindrical and aligned for opening and closing movement about a common axis, so that a single stem may be caused to operate both by movement of a single handle.

In addition to opening and closing the valves together it is sometimes desirable that a lead be given to one of the valves, and such is an object of this invention.

Also, it is very desirable that means be provided for limiting the maximum passage area provided by each valve in open position, and particularly for controlling each of these areas independent of the other; and such is another object of this invention.

Still another object of the invention is to so arrange the parts that the usual straight-line characteristics particularly of the gas valve, are not affected by the described limiting adjustment.

The invention also comprises the provision of valve means of the class described having further objects and advantages which will be apparent from the following description taken in connection with the accompanying drawings, in which Figs. 1 and 2 are typical sections in elevation, at 90° angles with each other, of a preferred embodiment of our invention; Fig. 3 is a top end view of the same; and Fig. 4 is a transverse section through the gas valve taken in the plane of line 4—4, Figs. 1 and 2.

With reference now to the drawings, the body of the proportioning valve comprises an air valve body 1 and a gas valve body 2. The valve body 1 is generally cylindrical and hollowed to provide a cylindrical chamber 3 for the air valve 4; and similarly the gas valve body 2 is provided with a cylindrical chamber 5 to receive the gas valve 6. The gas valve body is flanged as at 7 for assembly with the air valve body 1 as indicated, to form therewith a proportioning valve body unit wherein the chambers 3 and 5 are aligned and the chamber 3 closed at its lower end by the gas valve body, Figs. 1 and 2. The gas valve chamber 5 is preferably closed by a cap 16.

The valve body 1 is provided with opposed inlet and outlet openings 8 and 9, flanged as indicated at 8a and 9a for connection in an air pipe line; and similarly the body 2 is provided with opposed inlet and outlet openings 10 and 11, and threaded at 12 and 13 for connection in the gas pipe line as indicated at 14 and 15. All of the valve body openings 8, 9, 10 and 11 will be recognized as valve ports, and all are rectangular so that their opening and closing may have straight-line characteristics.

The gas valve 6 is generally cylindrical, fitting its chamber 5 and having a through transverse passage opening 17. The opening 17 is of rectangular section, of width coextensive with the openings 10 and 11. Within the opening 17 is a nut 18. The nut is provided with cylindrical end surfaces corresponding with the valve periphery, and the length of the nut is such that it fits transversely across the valve chamber 5 coextensive with the valve; the width of the nut is that of the valve passage opening 17. The dimension of the nut longitudinal of the valve is such that it may be lowered (Figs. 1 and 2) into the pocket 19 below the zone of the ports 10 and 11, leaving the upper face of the nut in the plane of the lower port edges; or it may be adjusted upwardly as in the position shown to diminish the effective area of the passage 17 between the ports.

In order to effect such adjustment of the nut, the nut is provided with a central screw-threaded opening to receive a screw 20 axial of the valve 6. The end of the valve is provided with a central opening to receive the head 21 of the screw. That the screw may be prevented from longitudinal movement in the valve it is necked down to form an annular groove 22 and a pin 23 is transversely arranged in the valve to enter the groove.

Thus upon rotation of the screw by means of the head 21, accessible by removal of the cap 16, the nut 18, which is prevented from rotation by its contact with the valve 6, may be adjusted longitudinally of the valve to limit the effective port opening.

It will be apparent that the secondary valve adjustment provided by the nut 18 has in itself a straight-line characteristic, and does not affect that of the primary opening and closing of the valve.

For actuation of the gas valve 6 a stem 24 bearing in the valve body 2 as at 25 is secured in an end opening of the valve as by a pin 26, the stem 24 extending through and beyond the air valve body 1 as indicated. The screw 20 may be arranged to bear in the end of the rod 24 as indicated at 27. Rigidly secured with the projecting extremity of the stem 24, as pinned at 28 is an actuating handle 29.

The air valve 4 comprises an opposed pair of segmental skirt portions 30, having straight edges so that the air valve as well as the gas valve will have straight line opening and closing characteristics. The chamber 3, in dome fashion to provide a pocket 31, extends beyond the zone of the ports 8 and 9.

Between the skirt portions 30 of the air valve are a pair of curtain members 32 carried by a yoke 33, the hub portion 34 of which is in screw-threaded relation with a curtain-actuating member 35 disposed in annular relation about the stem 24. The longitudinal dimension of the skirt members 32 is approximately that of the ports 8 and 9, and the pocket 31 is of sufficient depth to receive the curtain members 32 clear of the ports 8 and 9, as indicated Fig. 1. Thus it will be evident that angular adjustment between the yoke 33 and its actuating member 35 will effect longitudinal adjustment of the curtain members 32 to limit the maximum effective air passage through the air valve. Provision for such adjustment is made by a head 36 arranged outside the valve body and to which the actuating member 35 extends. The upper extremity of the air valve bears upon the curtain-actuating member 35 as at 37, and the air valve preferably is provided with a bearing as at 38 upon the stem 24 by means of a web 39. Springs 40 may be arranged about the stem 24 as indicated to maintain the air valve parts seated against the end of the air valve body.

That the air valve may be actuated by the handle 29, a member 41 is secured upon the end of the air valve casting extending beyond the air valve body. The member 41 has an extension 42 beneath the lever 29, having a pair of upstanding ears 43 one on either side of the lever. Into each of these ears is threaded a bolt 44 and the bolts may be turned inwardly as indicated in Fig. 3 to locate the angular relation of the air and gas valves; this relation being adjustable as will be apparent, by proper adjustment of the bolts 44.

That the adjusted relation of the air valve and its curtains may be maintained regardless of the setting of the air valve, a screw 45 may be provided on the lever 29 with its projecting end received by an opening 46 in the head 36 of the curtain-actuating member 35.

That the handle 29 may be positively secured in any adjusted positinon, it is provided with a bolt 47 which may be turned to engage the valve body as at 48; the member 42 having an elongated opening 49 to clear the bolt 47.

What we claim is:

1. Proportioning valve means comprising a valve body, a pair of aligned valves therein, one for air and the other for gas, and actuating means for said valves comprising a stem rigidly secured with the gas valve and extending therefrom through the air valve, a handle rigidly secured on the air valve end of said stem, a sleeve for actuating said air valve, arranged about said stem and extending therewith through the valve body end, and means for adjustably securing said handle with said sleeve to cause the valves to be moved together by operation of said handle, but to allow a variable lead to one of said valves.

2. Proportioning valve means comprising a valve body, a pair of aligned valves therein, one for air and the other for gas, curtain means associated with the air valve, and actuating means for said parts comprising a stem rigidly associated with the gas valve and extending therefrom through the air valve, an actuating member for said curtain means annularly disposed about said stem, a sleeve for actuating said air valve annularly disposed about said actuating member, said annularly disposed parts extending with said stem through the valve body end, said curtain actuating member having a head for operator adjustment, a handle rigidly secured on said stem outside said head, and means for adjustably securing said handle with said sleeve to cause the valves to be moved together by operation of said handle.

3. Proportioning valve means comprising a valve body, a pair of aligned valves therein one for air and the other for gas, curtain means associated with the air valve, and actuating means for said parts comprising a stem rigidly associated with the gas valve and extending therefrom through the air valve, an actuating member for said curtain means annularly disposed about said stem, a sleeve for actuating said air valve annularly disposed about said actuating member, said annularly disposed parts extending with said stem through the valve body end, said curtain actuating member having a head for operator adjustment, a handle rigidly secured on said stem outside said head, means for adjustably securing said handle with said sleeve to cause the valves to be moved together by operation of said handle, and means for releasably securing said head for movement with said handle.

In testimony whereof we hereby affix our signatures.

GEORGE R. BROWN.
GEORGE F. NAAB.